Jan. 26, 1943.  B. L. CORSON  2,309,168
DRY LIME HYDRATE AND PROCESS FOR PRODUCING SAME
Filed Aug. 2, 1940
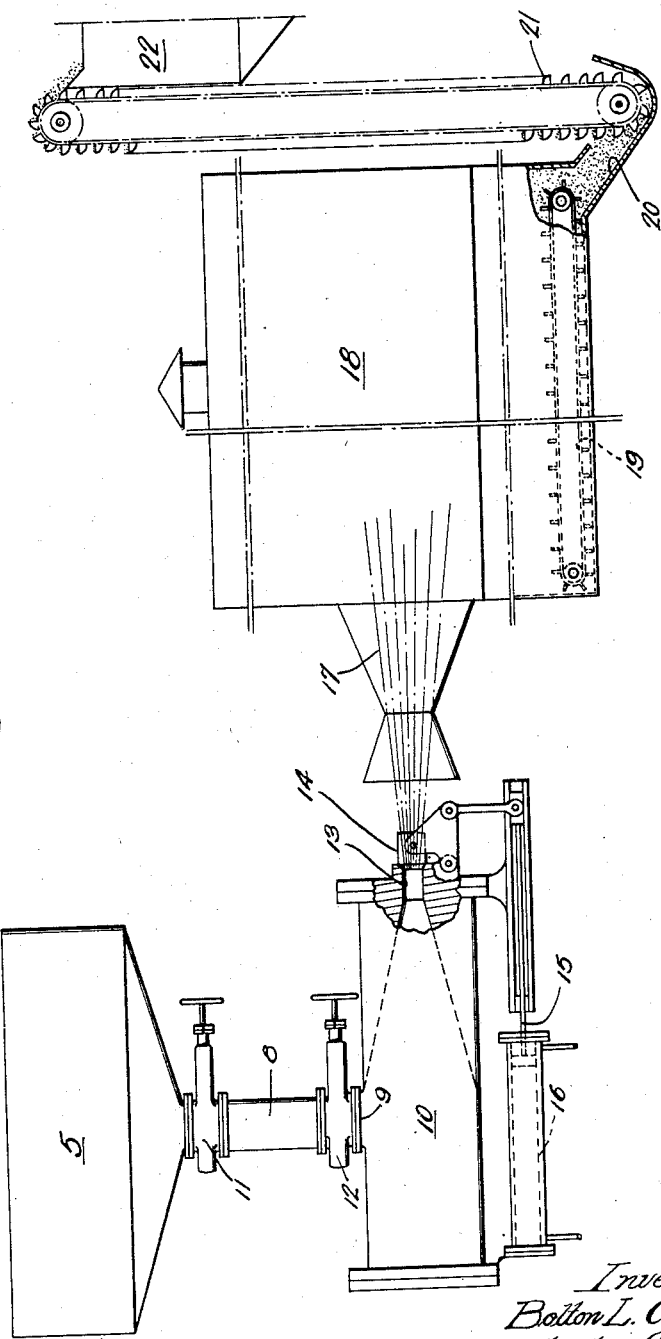
Inventor:-
Bolton L. Corson
by his Attorneys
Howson & Howson Patented Jan. 26, 1943

2,309,168

UNITED STATES PATENT OFFICE 2,309,168

DRY LIME HYDRATE AND PROCESS FOR PRODUCING SAME

Bolton L. Corson, Chestnut Hill, Pa., assignor to G. & W. H. Corson, Inc., Plymouth Meeting, Pa., a corporation of Delaware Application August 2, 1940, Serial No. 349,757

31 Claims. (Cl. 23—188)

This invention relates to a new and useful commercial lime hydrate and process or method of making the same. More particularly the invention relates to a novel commercial dolomitic lime hydrate having entirely novel physical properties, and is a continuation-in-part of my co-pending application Serial No. 211,952, filed June 4, 1938.

Until the early part of this century nearly all lime used was in the lump of pulverized quicklime form to which sufficient water was added on the job to produce a wet slacked quicklime which was then mixed with sand for plastering or mortar work. Quicklime is a perishable product and its conversion on the job to a quicklime putty is laborious, expensive, time consuming and the quality of the product varied considerably. Hence, in the latter part of the last century and the early part of this century, dry powdered hydrated lime was generally introduced on the market. This was made by adding only a small amount of water to the lime so as to form a dry powder which was then bagged and delivered to the job. This type of lime eliminates the slaking operation and has other advantages in that it may easily be handled, stored, etc.

In general, hydrated limes made in the foregoing conventional manner are, however, noticeably lacking in plasticity; that is, they do not spread easily under a trowel and tend to stick and pull with the result that the application of an even smooth coat, on a wall, is difficult to obtain. In addition, workability is not properly promoted in mortars, plasters, etc., and generally the strength characteristics of such hydrates are poor. For this reason, such hydrated limes are not acceptable for the finishing coat on plaster and are also inferior to properly slaked quicklimes for other uses. Furthermore, the sand carrying capacity of such limes is relatively low.

In order that hydrated lime may be classed as a plastic finishing lime, it must so react with water as to produce a putty having a plasticity of 200 or greater as determined by the Emley plasticimeter developed by the United States Bureau of Standards, it having been generally determined that a hydrated lime putty having a plasticity not less than approximately 200 may be spread comparatively easily upon a surface without undue sticking or pulling.

Limes in general may be divided into three types, namely, high calcium limes whose magnesium oxide content generally runs approximately 2% or less but which may run as high as 5 to 10%; high magnesium limes which are usually made from practically pure dolomite and contain approximately 40% magnesium oxide and 55% calcium oxide; and limes in between these two in magnesium content which are usually known as magnesium limes. Nearly all of the lime used for finishing purposes is made from high magnesium hydrates and, as produced by present day methods of hydration, it contains practically no, or very little, magnesium hydroxide when delivered on the job. However, upon being soaked in water overnight the lime develops considerable plasticity, and, of course, apart from this, some of the magnesia does hydrate. The high calcium and magnesium limes are uniformly non-plastic when hydrated in the conventional manner, and although high calcium limes have been processed in special ways, mentioned below, to produce somewhat plastic products, to our knowledge none of them has been able to compete on the same price basis with plastic high magnesium hydrates.

When these limes are hydrated by the ordinary process very little of the magnesium oxide is hydrated. It is the practice to soak such hydrates when used for finishing coats in water overnight, or, more usually, twenty-four hours in order to prepare them for use. Their "instantaneous" plasticity, that is, without soaking, is very low and even with the soaking the plasticity of most dry hydrated lime is very little improved and remains low. As a practical result substantially all of the hydrated magnesium limes which were to be used as finishing limes prior to my invention had to be soaked overnight, at least, to secure additional plasticity before use as finishing limes.

The aforementioned plastic dolomitic or magnesium finishing hydrates are found principally in certain sections of the State of Ohio, and the plastic hydrate produced in these sections of Ohio, in all probability, results either from the fact that the stone in these sections contain such small percentages of silica, iron and alumina that they do not combine with magnesium oxide and effect the colloidal structure of the hydrate, or from the particular geological formation of the stone. In any event the hydrates formed from these Ohio limes by hydrating in the present day hydrators require soaking with water to produce plastic finishing lime as do all dolomitic limes hydrated under the present commercial hydrating processes.

Plasticity, as it refers to lime, may be defined as a property which renders the lime capable of spreading easily on an absorbent surface, that is, as put by Mr. Emley in his "Measurement of Placticity," it depends directly upon the ability of the material in putty form to hold its water against the suction of an absorbent surface to which it is applied.

The Emley plasticimeter is a machine which has been developed by the Bureau of Standards for measuring plasticity. The higher the rating the more plastic is the lime. The putty made from ordinary hydrated lime, soaked before use, will receive a rating of about 100 on this machine. Limes which are known as finishing limes must receive a rating of at least 200 after soaking with water twenty-four hours.

Various attempts have been made from time to time to produce hydrated limes which are highly plastic, strong and of good sand carrying capacity. Some of these attempts consisted in adding to the lime various substances intended to attain one or more of these properties and while many of these have been effective to some extent, they have enjoyed little or no commercial success. Other attempts have consisted in the reduction of the lime particles by some form of pulverizing, and others have endeavored to hydrate the lime in an excess of water and subsequently drying it. These attempts generally proved neither satisfactory nor practical, the former due to the fact that it does not give true plasticity, strength and good sand carrying capacity and tends to produce a toughness in the lime under the trowel, and the latter because of the fact that these properties derived by the use of an excess amount of water may be to a large extent lost when the lime is subsequently dried by the methods employed.

Still other attempts have dealt with the hydration of lime under pressure. Under such processes magnesium oxide, incapable of being hydrated, to any great degree, in the hydrator at atmospheric pressures, may be hydrated and this is usually accompanied by complete hydration of the calcium oxide. However, in nearly all of these attempts the lime has been hydrated with approximately the same amount of water as when hydrated at atmospheric pressure, and the results of these experiments have not been satisfactory because no great gain in plasticity and other properties has resulted from such procedures and the methods on the whole were so much more expensive than the regular process that such methods were prohibitive commercially. On the other hand, the idea of hydrating with a very large excess of water has also been attempted but in this case, no adequate method of drying the wet slaked quicklime was known and the subsequently mentioned objections to such drying were not overcome.

Certain requirements are essential to the proper hydration of lime. To begin with, a large excess of water must be present at the time of hydration. By this it is meant not that a large excess of water over that theoretically needed must be present at the start of hydration of a mass of lime, but that there must be water in the liquid phase available to practically every particle of the lime at the time that particle of the lime changes from the oxide form to the hydroxide form. It is well known that calcium oxide hydrated solely in the presence of steam is extremely non-plastic.

In many processes limes are mixed with considerably more water than is necessary to satisfy their chemical requirement, but the heat of hydration is so great that, in the absence of a restraining influence present to prevent this water from changing to steam and leaving the lime, when the greater portion of the lime is hydrated, it is hydrated in an atmosphere of steam rather than being surrounded by water in the liquid phase. Attempts have been made to overcome this condition by endeavoring to prevent the temperature of the water from rising above 212% F. In such cases the hydration of the lime is slowed down and this has quite a detrimental effect on plasticity and other properties due, it is believed, to the formation of larger crystals.

The second point which is essential is that the water shall be intimately mixed with the lime and it is, therefore, preferable to have the quicklime ground finely enough so that the water can get to all of its easily. Another point is that it is very essential to have quick hydration.

Elevated temperature and pressures during the reaction not only greatly speed the hydration but help to produce a finely divided hydrate and to thoroughly hydrate even the magnesium oxide which in normal hydration processes is hydrated very little, if at all.

Having hydrated the lime under proper conditions and produced an extremely plastic, finely divided wet slaked quicklime there is a very difficult problem as to how this can be dried without loss of the desired properties. By this it is meant to point out that if the ordinary mixture of lime and water is dried by the usual methods employed for drying similar mixtures, the plasticity and other properties are definitely destroyed. If, however, the process as outlined herein and in my previous application above identified is used to dry the material by passing it through air that is capable of absorbing from the particles, while finely dispersed, the moisture which is adhering to them they will be left substantially dry and with their basic properties unaffected. I find that the reason for this resides in the fact that this novel manner of drying serves to preserve the minute size, structure and gelatinous character of the individual lime particles existing in the wet slaked quicklime prior to drying, whereas conventional drying methods heretofore employed do not preserve that particle size and structure but, to the contrary, destroy it and operate to greatly alter the structure, increase the size of the lime particles and destroy their gelatinous character.

Hence, the ability to be able to dry the wet slacked quicklime while retaining the individual particle size, structure and gelatinous character as they exist in the wet slaked quicklime is, I believe, the principal factor in producing a dry lime hydrate having the properties herein set forth, wherein the dry hydrate has a particle size, structure not substantially less than, and gelatinous character substantially the same as, that existing in the wet slaked quicklime. Too, these hydrates have a plasticity and sand carrying capacity immediately upon mixture with water not substantially less than that of said wet slaked quicklime.

Hydration by a large excess of water at elevated pressures and temperatures is helpful with high calcium limes because the hydrate secured by the rapid hydration is more colloidal and less crystalline and because the hydration is more reliably complete. In addition the process has high utility when it is applied to a magnesium or a dolomitic lime because it overcomes the difficulty mentioned previously in hydrating the magnesia.

I have discovered that if lime is hydrated first with plenty of water to take care of the calcium oxide, in spite of the fact that it is of value to have water in the liquid phase present when the magnesia is hydrated, the hydration of the magnesia may be done with steam on a product in which a large excess of water has been used previously to hydrate the calcium. That is to say, a satisfactory product can be obtained by using a large excess of water to hydrate the calcium and then using steam to hydrate the magnesia, after which it may be dried as outlined hereinafter.

With these observations in mind, the principal object of the present invention is to provide a dry lime hydrate which has a high plasticity immediately upon mixture with water preparatory to use, i. e., above 200; and will produce a highly plastic putty having high strength, good bonding power, and high water retention properties.

Another object of the invention is to provide a dry lime hydrate consisting of a multitude of individual lime particles having a size, structure not substantially greater than, and gelatinous character substantially the same as, the size, stucture and gelatinous character of the lime particles existing in the wet slacked quicklime prior to drying and which has a plasticity and sand carrying capacity not substantially less than that of said wet slacked quicklime immediately upon mixture with water.

Another object of the invention is to provide a novel method or process of making a lime hydrate of the type described wherein the calcium oxide content is completely hydrated and at least the major portion of the magnesium oxide hydrated.

Still another object of the present invention is to provide a hydrated lime product of the type described which has a substantially increased sand carrying capacity.

A further object of the invention is to provide a novel process or method of the character described which may be employed generally to produce a highly plastic hydrated lime without strict limitation as to its chemical composition or geographic location.

These and other objects of the invention and the features and details thereof are hereinafter fully set forth and shown in the accompanying drawing, in which:

The single figure is a diagrammatic illustration of one form of apparatus and flow system employed in practicing the present invention.

In the most advantageous form of the invention, I hydrate the lime with a considerable excess of water under pressure and then, when hydration is complete, I dry the resulting wet slaked quicklime by effecting a finely divided dispersion of said product under conditions, or into an atmosphere capable of vaporizing or absorbing spontaneously the excess water from the product.

The instantaneous evaporation or absorption of the water from the lime particles while in a finely divided dispersion leaves a dry powdered hydrate and the fineness of the powder leaves no advantage to be secured from a pulverizing mill in the way of further reducing the size of the individual particles of the hydrated lime.

Of particular importance is the fact that by the process of the invention the magnesium and calcium oxides in the quicklime are substantially completely hydrated and, therefore, the possibility of any unsoundness developing in mortar or plaster due to unhydrated particles is eliminated.

Quicklime hydrated in this manner not only attains high plasticity (considerably in excess of 200 Emley plasticimeter), but in most cases substantially maximum plasticity, as soon as it is thoroughly mixed with water, but we have found that within a few weeks' time such a hydrated lime develops great strength. By this is meant that, under field conditions, the fact that all of the lime is in the hydroxide form enables it to carbonate much more rapidly and, therefore, its hardening is greatly accelerated.

Of equal importance is the fact that the dry powdered hydrate produced according to the present invention has a sand carrying capacity far in excess of the sand carrying capacity of prior hydrated limes, and in fact has a plasticity and sand carrying capacity comparable to that of the wet slacked quicklime prior to being dried. This feature of the product of this invention is of substantial economic benefit to contractors and other users of hydrated lime in mortars, plasters, etc. The accepted standard for measurement of sand carrying capacity of limes, cements and the like in relation to the workability of these products is the Voss extrusion energy machine, the procedure employed being set forth in "Effects of Lime on Mortar and Concrete" by Walter H. Voss appearing in Proceedings of the National Lime Association for 1939 (copy available in Library of the National Lime Association, Washington, D. C.) and the product of the present invention has been proved by this standard to be capable of producing a workable mortar or plaster upon mixture with sand in the ratio of one part hydrated lime to as high as from 4 to 4.25 parts sand whereas, so far as I am aware, no other dry hydrated lime product has been produced which will yield a workable mortar or plaster when mixed with more than 2¾ parts of sand and generally only about 2 parts of sand. Thus the workable sand carrying capacity of the present product is approximately 100% greater than prior dry hydrated lines for the same degree of workability.

As used herein and in the claims the term "plasticity" means plasticity as determined by the Emley plasticimeter hereinabove referred to, and the term "sand-carrying capacity" means sand-carrying capacity as determined by the Voss extrusion energy machine following the procedure set forth in the article by Walter H. Voss hereinabove referred to.

This increased sand carrying capacity of the present product may be attributed to the extremely small or fine particle size of the dry hydrate produced, since this particle size is quite considerably smaller than the particles of ordinary dry hydrated limes and approximates the particle size and structure of slaked quicklime putty which likewise is known to have a workable sand carrying capacity considerably in excess of ordinary dry hydrates.

This smaller particle size existing in the lime hydrate of the present invention and the similarity thereof to the particles existing in the wet slaked quicklime prior to drying is evidenced by the settling rate of each of these in comparison with lime hydrate produced according to conventional practice. These comparative tests were made according to Bureau of Standards practice by producing milks of lime of like consistency and the time given in each case is the time required for the respective milks of lime to settle fifty per cent of their original height.

The time required is inversely proportional to the particle size and hence the shorter the time the larger the particle size.

|  | Minutes |
|---|---|
| Hydrate (this invention) | 34 |
| Conventional hydrate | 21 |
| Wet slaked quicklime (prior to drying) | 34 |

The excellent water retention property of the present product in comparison with that of lime hydrate produced according to conventional practices is evidenced by the following figures, the figure given in each instance being the time required for the water in lime putties of like consistency to visibly appear at the underside of a blotter on which a mass of said putty has been placed. This time is measured in counts.

Water retention data

|  | Counts |
|---|---|
| Hydrate (this invention) | 40 |
| Conventional hydrate | 6 |
| Wet slaked quicklime (prior to drying) | 40 |

Indicative of the distinctly novel product of the present invention is the fact that the dry lime hydrate of the present invention and hydrated lime produced according to prior conventional hydration methods (using essentially the same raw quicklime for both) gave the following results when subjected to comparative tests to determine the respective plasticity of each. These are further compared with wet slaked quicklime prior to drying.

Emley plasticimeter figure

| Time | Hydrate (this invention) | Conventional hydrate | Wet slaked quicklime (prior to drying) |
|---|---|---|---|
| Immediately | 280 | 95 | 280 |
| 3 hours | 280 | 110 | 280 |
| 24 hours | 275 | 115 | 280 |

These tests were made on an Emley plasticimeter following A. S. T. M. specifications with the exception of time. The time given is the time from the addition of water until the start of the plasticity test.

Thus the product of the present invention provides a dry finely powdered hydrated lime which has substantially its entire magnesia content in the hydroxide form (hydrated), has a high sand carrying capacity, good water retention properties, and which is capable of exhibiting a plasticity considerably in excess of 200, and in most cases its maximum plasticity, immediately upon mixture with water. The product is further characterized by its high strength and superior soundness and adhering properties.

As previously stated, the novel product of the present invention may be produced by reacting quicklime with a large excess of water in order to hydrate the calcium content therein and under pressure sufficient to hydrate substantially all of the magnesia content of the lime. Hydration of the calcium and magnesium may be carried out simultaneously or as independent steps or stages of the process. Then, when hydration of the calcium and at least the major portion of the magnesia content of the lime has been completed, the resulting wet slaked quicklime may be dried by effecting a finely divided dispersive discharge thereof into an atmosphere capable of vaporizing or absorbing spontaneously the excess water carried by the lime particles discharged, while still in a dispersed state, thus leaving a substantially dry powdered hydrated lime.

One of the difficulties heretofore in producing dry lime hydrate having the physical properties of the present product is due to the fact that the various conventional methods of drying the wet slaked quicklime actually destroyed the plasticity and other properties present in the wet slaked quicklime regardless of the extent of hydration with the result that all of the benefit and advantages that could have been obtained in a hydrated lime by properly hydrating it were ultimately lost in the drying operation. Thus proper drying of the wet slaked quicklime without destroying the benefits derived from adequate and substantially complete hydration is the principal factor which enables the production of a dry lime hydrate having the superior physical properties embodied in the product of the present invention, and I have determined that the solution to the problem of successful drying requires that the wet slaked quicklime be dried quickly and while the material is maintained in the finely divided particle form. This is so, for as previously stated, I have found that this manner of drying serves to preserve the minute size, structure and gelatinous character of the individual lime particles existing in the wet hydrate prior to drying, and imparts to the product, when dried, a plasticity and sand carrying capacity, upon mixture with water, comparable to that of said wet slaked quicklime.

Thus successful drying of the wet slaked quicklime can be accomplished to give a dry lime hydrate having all of the beneficial properties developed during hydration by causing a finely divided dispersion of the wet lime particles to pass through or into an atmosphere capable of vaporizing or absorbing spontaneously the excess water from said particles. This may be accomplished by any suitable form of spray discharge, either as an entirely separate and distinct step of the process, or by employing the pressure used to hydrate the oxide content of the lime to effect a spray discharge of the wet slaked quicklime directly from the hydrator chamber when hydration is accomplished.

The latter method is to be preferred not only because of economy as respects both time and expense but also because I have found that if the design of the apparatus is such that the material is ejected in the form of a spray through a small aperture or orifice rather than exploded through a comparatively larger aperture, then it is essential that a very much greater excess of water be used, and the design of the collecting chamber must be such that the sprayed material does not touch the walls of the chamber before drying. Also, a large amount of additional heat must be supplied in the collector in order to take care of the evaporation of the extra water. Furthermore, it has been found that the wet slaked quicklime dried by spraying through a small aperture does not reach its maximum plasticity immediately upon mixture with water but requires some hours soaking to reach its highest value. A further disadvantage is that if the lime, after being sprayed, is kept at a high temperature for any length of time a marked decrease in plasticity and an increase in particle size is noted, and this may, in part, account for the fact that ordinary limes which are slaked on the job in large quantities and at high temperature for many hours do not show the unusual properties of lime hydrated by the process of the present invention.

As illustrative of the preferred method of producing the dry lime hydrate of the present invention, and referring to the drawing, the lime and water may be stored in suitable receptacles or tanks 1 and 2, respectively, which have openings in the bottoms thereof leading to conduits 3 and 4 which are directed into an underlying mixing device 5, suitable valves 6 and 7 being provided for controlling and regulating the amount or quantity of lime and water admitted to the said mixing device 5. Lime and water are supplied to the mixing device from the supply tanks 1 and 2, respectively, in such ratio or proportion as will give an excess of water content to the mixture of approximately twice the amount theoretically needed to hydrate both the magnesium and calcium oxides.

An outlet is provided in the bottom of the mixing device 5, and this opens to a conduit 8 which leads into an opening 9 formed centrally in the top of a high pressure cylinder 10. A valve 11 is provided adjacent the mixing device 5 for controlling discharge of the mixture of lime and water therefrom and a valve 12 capable of resisting great pressure is provided for the opening 9 in the pressure cylinder 10 in order that the latter may be tightly closed and sealed. The interior of the cylinder 10 may taper uniformly toward the discharge opening 13 at one end of the said cylinder and this discharge opening 13 is provided with a closure valve 14 which is also capable of resisting great pressures when closed in order to tightly seal the said cylinder.

Opening and closing of the valve 14 for the discharge opening 13 is preferably effected by means of a compressed air actuated piston 15 which operates within a cylinder 16 and is connected to the valve element 14 in the manner shown in the drawing. Suitable connections lead to opposite ends of the cylinder 16 and passage of air therethrough to the said cylinder is controlled by means of a valve mechanism to positively actuate the piston 15 in alternately opposite directions. Thus when closed the valve 14 is held by air pressure firmly and tightly in closing relation with respect to the discharge opening to seal the same against pressure losses or dissipation, and may be positively and quickly opened by operating the control valve to admit air under pressure to the opposite side of the said piston 15. It will be understood, however, that valves of other types and operation may be employed to control discharge of the product through the opening 13, and the suddenness of valve opening required in each instance will, of course, depend upon the size of the said opening 13 and the valve 14; that is, for example, in the case of a relatively small opening 13, the valve 14 will be opened suddenly or quickly whereas in the case of a relatively larger opening 13, such valve may be opened more slowly.

A typical example of this process in practice may consist in mixing together in the device 5, 300 pounds of pulverized dolomitic quicklime and 227 pounds of water until a free flowing slurry is produced. The valves 11 and 12 are then opened and the slurry is allowed to flow through the pipe 8 into the pressure cylinder 10, the exhaust valve 14 of which is tightly closed. The valve 12 is then tightly closed to seal the cylinder of chamber 10 and after approximately one or two minutes the pressure within the cylinder begins to rise substantially, often reaching pressures as high as 600 pounds per square inch after only three or four minutes. The reaction is allowed to continue until a drop in pressure occurs at the end of approximately from three to seven minutes.

When these conditions have been attained the valve 14 is suddenly opened in the manner previously described and a mass comprising the wet slaked quicklime particles, steam, water vapor, water and air, discharges from the cylinder through the opening 13 with explosive-like violence. Approximately the entire contents of the cylinder 10 are thus discharged and, as the temperature of these substances is in the neighborhood of approximately from 400° F. to 450° F., the water in the discharged mass is immediately converted into steam due to the almost instantaneous reduction or dissipation of the pressure occasioned by the opening of the valve 14.

The reaction that takes place within the cylinder 10 is, of course, exothermic and generates a tremendous amount of heat and is also accompanied by the generation of substantial pressure. The water which is added in excess of the lime ordinarily would be converted into steam at the temperatures generated by the reaction but the greater pressures also developed within the chamber maintain nearly all of the water in a liquid state throughout the reaction and thus ensure maximum and proper hydration of the calcium and magnesium in the lime as hereinafter more fully explained. However, when the chamber is suddenly opened, the pressure is released from the said chamber with explosive-like violence carrying with it the wet slaked quicklime which is finely divided and dries almost immediately upon contact with the atmosphere due to the fact that as soon as the pressure within the sealed chamber is released, the high temperatures present and generated by the reaction cause the excess water to be immediately converted into steam vapor which separates from the hydrated lime particles as they emerge from the chamber, leaving a dry powdered lime hydrate which is highly plastic. Drying in this manner is entirely different from other and conventional forms of drying in its effect upon the product dried.

To properly and clearly understand the action which takes place within the cylinder or chamber 10, it is pointed out that the said chamber is preferably of such size that the slurry mixture of quicklime and water initially occupies approximately one-half of the interior thereof leaving one-half of the space within the cylinder unoccupied before hydration begins to take place. This space is considerably reduced at least approximately 50% by expansion of the slurry during hydration which substantially fills the cylinder 10 leaving tiny spaces between the lime particles which constitute the remaining space left in the said cylinder, and since the reaction is exothermic in the above typical example this remaining space in the cylinder 10 is occupied by water and steam at approximately 400 pounds pressure. However, steam at such pressure contains only 0.86 pound of water per cubic foot and therefore less than 1% of the water in the charge of slurry is converted into steam with the result that hydration of the slurry is effected substantially entirely by water. In fact, experiments have been conducted wherein hydration was effected in the complete absence of steam by subjecting the lime to sufficient initial air pressure to prevent the formation of any steam within the cylinder, other suitable gases under pressure obviously being usable for this purpose in lieu of air. When, however, the discharge port of the cylinder is opened to suddenly release the pressure therein this large quantity of water is immediately converted into steam with an explosive-like action and it is upon the violence of this action that rapid and complete discharge of the material from the cylinder depends.

Collection of the finely divided dry hydrated lime reaction product may be effectively accomplished by causing the material to discharge from the cylinder 10 through a Venturi section 17 and into a chamber 18 of substantial size. By discharging the contents of the cylinder 10 through the Venturi section 17, air from the surrounding atmosphere is sucked into the mass and since this air is of a relative humidity substantially less than 100% the steam and the condensed vapor in the mass is absorbed and carried upwardly and off by the air leaving a finely divided hydrated lime product sufficiently dry to be bagged and it readily settles to the bottom of the chamber 18, the total weight of the hydrated lime product produced from the foregoing example being approximately 420 pounds of a plasticity immediately upon mixing with water of 275. As the particles of dry hydrated lime settle to the bottom of the chamber 18 they are conveyed in any suitable manner, such as by means of a conveyor 19, to a trough 20 at one end of the said chamber 18 from which they are picked up by a conveyor 21 and carried and deposited into a storage hopper 22 ready to be bagged for the market, although it may be classified before entering the bagging machine to remove any foreign material that may exist. In the commercial production of lime according to the present invention it has been found desirable to heat the air in the collecting chamber and thereby increase the water-absorbing ability thereof.

The present invention involves a dry hydrated lime having at least the major portion of its magnesia in the hydroxide form and a sand carrying capacity far in excess of other dry hydrated limes. The product also is capable of developing a high plasticity (over 200) and, in most cases its maximum plasticity, immediately it is mixed with water for use and the herein described method or process may be employed generally to produce such a hydrated lime from ordinary limestone without strict limitation to limestone obtained from any particular quarry or geologic location or section of this or any other country. The product, furthermore, is composed of a multitude of individual lime particles which have a size, structure and gelatinous character substantially the same as that existing in the wet slaked quicklime prior to drying and, immediately upon mixture with water, has a plasticity and sand carrying capacity comparable to that of said wet slaked quicklime.

A hydrated lime which attains approximately its maximum plasticity according to the invention as soon as it is mixed with water for use is particularly advantageous in that calcined gypsum, usually employed in the finishing coat of plaster, may be mixed with the dry hydrate either at the plant prior to delivery to the job, or at the job prior to the mixture of the dry hydrate with water, thereby enabling the ingredients to be more thoroughly and exactly mixed without a great deal of hand mixing on the part of the plasterer and saving considerable time. Such procedure is, of course, in direct contrast to prior practices which required that the hydrated lime be soaked in water for a substantial period, usually overnight, and that the calcined gypsum be added to the lime putty only after such soaking due to certain setting properties of calcined gypsum which prohibits its mixture with water except immediately prior to application upon a wall or other surface.

Another important and really valuable characteristic or property of the lime product of the present invention is that when mixed with water it does not stiffen appreciably on standing and, therefore, can be effectively used in mortar without the necessity for the mason having continually to keep working the mortar into a moist condition as with other hydrated limes.

It will be obvious, of course, that, instead of carrying out the hydration of both the calcium and magnesia contents of the lime simultaneously within the hydrator, the hydration of the calcium and magnesia may be carried out as separate and independent steps if desired and then dried in accordance with the present invention without destroying or lessening the superior physical and chemical properties of the present product. Thus it is entirely within the scope of the invention to take lime hydrated in accordance with conventional methods (with no appreciable magnesia in the hydroxide form) and further treat such hydrate under pressure to hydrate the magnesia content after which the final hydrated product may be dried in the novel manner hereinabove set forth to produce the product of the invention.

It is pointed out that the success of the process of the invention is not dependent upon temperatures and pressures of the extremely high order given in the foregoing typical example but the design of the particular apparatus illustrated is such that the pressure employed be relatively high (that is to say, at least in excess of 100 lbs. per square inch) in order effectively to discharge the wet slaked quicklime from the chamber and dry it. It is pointed out, however, that it is entirely possible to carry out the process at quite low pressures, say of the order of 25 lbs. per square inch, if there is provided a discharge valve area very large in comparison to the chamber, and if the chamber interior is streamlined to an extent that such low pressure is capable of discharging sufficient lime so that there is no build-up of the product within the chamber when continuously operated. In the case of such low pressure operation of the process, it may be desirable or necessary to provide additional pressure to assist in the discharge of the wet slaked quicklime from the chamber and this may be done by discharging thereinto air, steam, or other suitable gaseous mixture under sufficient pressure.

However, if the process is designed for low pressure as above described, then it is essential that the air within the collection chamber be heated to a considerable degree and also the design of said collection chamber must be such that the lime particles discharged into it travel a considerable distance in said collector before they strike either the sides or bottom thereof. In any event, the ability of the process to work at such low pressures should be entirely clear when it is considered that the present process depends fundamentally upon the change of volume which takes place when water in the liquid phase is converted into steam—a change in volume, for example, for 100 lbs. of water of from 1.67 cubic feet of water to 2680 cubic feet of steam at 212° F. Thus it will be seen that while it is entirely possible to carry out the present process at relatively low pressures, economic and operating conditions incident thereto seem to render the use of such low pressures of questionable practicability for the commercial production of hydrated lime.

The term "dry hydrated lime" used herein is not intended to be limited to a lime hydrate which is absolutely free from moisture which is chemically uncombined, as it is quite common in the trade for dry hydrated limes to contain as much as from 2% to even 3% and 4% uncombined moisture. The presence of this amount of moisture in a lime hydrate does not, however, preclude its being bagged and marketed in paper bags and hence the term "dry hydrated lime" used herein is meant to include any lime hydrate which contains so little free moisture that it may be readily bagged, shipped and handled in paper bags in contrast, for example, to a lime hydrate which is in the form of a putty or paste.

In lieu of mixing the quicklime and water prior to introduction to the cylinder 10, it will be understood, of course, that these ingredients may be mixed directly in said cylinder in any suitable manner such as by mechanical or pneumatic means. The invention may be employed in conjunction with both high calcium and high magnesium limes, and is, of course, capable of numerous ramifications and variations both in the procedure and proportions of materials employed depending upon conditions which may differ from time to time as respects a particular installation and its location as well as the chemical composition of the lime supply available, and it is not intended to limit the present invention to the particular disclosure herein illustrated and described so long as within the scope of the annexed claims.

I claim:

1. In the method of making a powdered dry lime hydrate the steps which comprise hydrating under pressure the calcium oxide content of quicklime, hydrating at least the major portion of the magnesia content of said quicklime, said hydrating being accomplished with water in excess of that which will combine as water of hydration and then substantially instantaneously drying the resulting slaked quicklime by effecting a finely divided suspension of the particles thereof by dispersing the same in an atmosphere under conditions causing the substantially instantaneous conversion to the vapor phase of excess water in the dispersed finely divided particles.

2. In the method of making a powdered dry lime hydrate the steps which comprise hydrating the calcium oxide content of quicklime, hydrating at least the major portion of the mgnesia content of said quicklime under pressure, said hydrating being accomplished with water in excess of that which will combine as water of hydration and then substantially instantaneously drying the resulting slaked quicklime by effecting a finely divided particle dispersion thereof under the impetus of said pressure in an atmosphere which substantially instantaneously absorbs excess water in the dispersed finely divided particles.

3. In the method of making dry lime hydrate, the steps which comprise reacting under pressure quicklime with an excess of water, and thereafter substantially instantaneously vaporizing excess water from the resulting wet slaked quicklime to dry the same by effecting a finely divided suspension of the particles thereof by dispersing the same in an atmosphere under conditions causing the substantially instantaneous conversion to the vapor phase of excess water from the dispersed finely divided particles.

4. In the method of making dry lime hydrate, the steps which comprise reacting quicklime with an excess of water under pressure, and thereafter substantially instantaneously vaporizing excess water from the resulting wet slaked quicklime to dry the same by effecting a finely divided suspension of the particles thereof by dispersing the same in an atmosphere under conditions causing the substantially instantaneous conversion to the vapor phase of excess water in the dispersed finely divided particles, and collecting the dry hydrated lime particles.

5. In the method of making dry lime hydrate, the steps which comprise reacting quicklime with an excess of water and under pressure sufficient to hydrate at least the major portion of the magnesia content of said quicklime, and thereafter substantially instantaneously vaporizing excess water from the resulting wet slaked quicklime to dry the same by effecting a finely divided suspension of the particles thereof by dispersing the same in an atmosphere under conditions causing the substantially instantaneous conversion to the vapor phase of excess water in the dispersed finely divided particles.

6. In the method of making dry lime hydrate, the steps which comprise reacting quicklime with an excess of water under pressure sufficient to hydrate at least the major portion of the magnesia content of said quicklime, and thereafter substantially instantaneously vaporizing excess water from the resulting wet slaked quicklime to dry the same by effecting a finely divided particle dispersion thereof under the impetus of said pressure in an atmosphere under conditions causing the substantially instantaneous conversion to the vapor phase of excess water in the dispersed finely divided particles.

7. In the method of making dry lime hydrate, the steps which comprise hydrating at least the major portion of the magnesia content of a lime hydrate having its calcium content in the hydroxide form, said hydrating being accomplished by reacting the same under pressure with water in excess of that which will combine as water of hydration and then substantially instantaneously vaporizing excess water from the resulting wet slaked quicklime to dry the same by effecting a finely divided suspension of the particles thereof by dispersing the same in an atmosphere under conditions causing the substantially instantaneous conversion to the vapor phase of excess water from the dispersed finely divided particles.

8. In the method of making substantially dry hydrated lime, the steps which comprise reacting quicklime with an excess of water in a closed chamber and under pressure generated entirely by said reaction, and then substantially instantaneously vaporizing excess water from the resulting wet slaked quicklime by suddenly releasing the pressure from said chamber to cause a finely divided dispersive discharge of said product therefrom under conditions causing the substantially instantaneous conversion of excess water into the vapor phase which vaporizes off from the dispersed finely divided particles leaving a substantially dry hydrated lime.

9. The method of making a dry lime hydrate having high plasticity which comprises reacting quicklime with a large excess of water in the liquid phase to hydrate the calcium oxide content thereof, hydrating under pressure the magnesia content of the quicklime with at least some water in the liquid phase in excess of that which will combine as water of hydration, and then substantially instantaneously drying the resulting wet slaked quicklime by effecting a finely divided suspension of the particles thereof by dispersing the same in an atmosphere under conditions causing the substantially instantaneous conversion to the vapor phase of any excess free water in the dispersed finely divided lime particles.

10. The method of making a dry lime hydrate having high plasticity which comprises reacting quicklime with a large excess of water in the liquid phase to hydrate the calcium oxide content thereof, hydrating the magnesia content of the quicklime under presure with at least some water in the liquid phase in excess of that which will combine as water of hydration, and then substantially instantaneously drying the resulting wet slaked quicklime by effecting a finely divided dispersion thereof under the impetus of said pressure in an atmosphere under conditions causing the substantially instantaneous conversion to the vapor phase of any excess free water in the dispersed finely divided lime particles.

11. In the method of making hydrated lime, the steps comprising thoroughly mixing a predetermined quantity of pulverized quicklime with a large excess of water to produce a free flowing slurry, admitting said slurry to a chamber and allowing the quicklime and water to react under pressure in said chamber while closed, and substantially instantaneously drying the hydrated reaction product and effecting spontaneous discharge thereof from said chamber by suddenly releasing the pressure from the chamber under conditions causing the conversion of excess water into the vapor phase which passes off leaving a substantially dry hydrated lime.

12. In the hydration of lime, the method which comprising reacting quicklime with water in the liquid phase in a chamber under pressure at temperatures above 212° F., said water being in excess of that which will combine as water of hydration and substantially instantaneously vaporizing excess water in the hydrated product by effecting a finely divided dispersive discharge of the product from the chamber under conditions causing the substantially instantaneous conversion of excess water into the vapor phase which passes off leaving a substantially dry lime hydrate, discharge of the product from the chamber being effected through sudden release of said pressure.

13. In the method of hydrating lime, the steps which comprise reacting quicklime with an excess of water in a closed chamber under pressure, and thereafter substantially instantaneously drying the hydrated lime reaction product by effecting a finely divided dispersion of said hydrated lime reaction product by discharging the same from said chamber under the influence of said pressure and under conditions causing the conversion of excess water into the vapor phase which passes off leaving a substantially dry lime hydrate.

14. In the method of making hydrated lime, the steps which comprise reacting quicklime with water in the liquid phase in a chamber under pressure, said water being in excess of that which will combine as water of hydration and, thereafter substantially instantaneously drying the hydrated reaction product by effecting a finely divided discharge thereof from said chamber under the influence of said pressure and under conditions causing the conversion of excess water into the vapor phase which passes off leaving a substantially dry lime hydrate.

15. In the method of making hydrated lime having high plasticity and strength, the steps which comprise reacting quicklime with a large excess of water in the liquid phase in a closed chamber under pressure, and then substantially instantaneously drying the hydrated reaction product by effecting a finely divided discharge thereof from said chamber under conditions causing the substantially instantaneous conversion of excess water into the vapor phase which passes off leaving a substantially dry lime hydrate, the discharge of the product from the chamber being effected by suddenly releasing the pressure therefrom.

16. In the method of making hydrated lime, the steps which comprise thoroughly mixing a predetermined quantity of quicklime with liquid water to produce a slurry, said water being in excess of that which will combine as water of hydration admitting said slurry to a chamber and allowing the quicklime and water to react under pressure in said chamber, and thereafter substantially instantaneously drying the hydrated reaction product by effecting a finely divided suspension of the particles thereof by dispersing the same from said chamber into an atmosphere under conditions causing the substantially instantaneous conversion of excess water into the vapor phase which passes off leaving a substantially dry lime hydrate.

17. In the method of making hydrated lime, the steps which comprise thoroughly mixing a predetermined quantity of quicklime with liquid water to produce a slurry, said water being in excess of that which will combine as water of hydration admitting said slurry to a chamber and allowing the quicklime and water to react under pressure in said chamber, and thereafter substantially instantaneously drying the hydrated reaction product by effecting a finely divided dispersive discharge thereof from said chamber under conditions causing the substantially instantaneous conversion of excess water into the vapor phase which passes off leaving a substantially dry lime hydrate, the discharge of the product from the chamber being effected by suddenly releasing the pressure therefrom.

18. In the method of making hydrated lime, the steps which comprise reacting quicklime with water in the liquid phase in a chamber under pressure, said water being in excess of that which will combine as water of hydration, substantially instantaneously drying the hydrated reaction product by effecting a finely divided dispersive discharge thereof from said chamber under the influence of said pressure and under conditions causing the substantially instantaneous conversion of excess water into the vapor phase which passes off leaving a substantially dry lime hydrate, and then collecting together and storing the thus dried reaction product.

19. In the method of making hydrated lime, the steps which comprise reacting quicklime with water in the liquid phase in a chamber under pressure, said water being in excess of that which will combine as water of hydration drying the hydrated reaction product by effecting a finely divided dispersive discharge thereof from said chamber under the influence of said pressure and under conditions causing the conversion of excess water into steam which vaporizes off leaving a substantially dry lime hydrate, and assisting in the drying of said reaction product by causing air to be entrained therein during discharge from the chamber.

20. A dry powdered lime hydrate, produced by hydrating under pressure quicklime with an excess of water and then substantially instantaneously drying the hydrated quicklime by effecting a finely divided suspension of the particles thereof by dispersing the same in an atmosphere under conditions causing the substantially instantaneous conversion into the vapor phase of excess water in said particles while dispersed, said dry powdered lime hydrate being characterized by its ability to develop a plasticity in excess of 200 and a workable sand carrying capacity in excess of about 3 parts sand to one part lime hydrate by volume substantially immediately upon mixture with water, the average size of the individual particles of said hydrate not being substantially greater than the average size of the particles existing in a quicklime putty hydrated by the method of adding an excess of water to quicklime, the quicklime from which such putty is made being the same as the quicklime from which said dry hydrate is produced.

21. A dry powdered lime hydrate, produced by hydrating quicklime with an excess of water under pressure and then substantially instantaneously drying the hydrated quicklime by effecting a finely divided particle dispersion thereof under the impetus of said pressure in an atmosphere under conditions causing the substantially instantaneous conversion into the vapor phase of excess water in said particles while dispersed, said dry powdered lime hydrate being characterized by its ability to develop a plasticity in excess of 200 and a workable sand carrying capacity in excess of about 3 parts sand to one part lime hydrate by volume substantially immediately upon mixture with water, the average size of the individual particles of said hydrate not being substantially greater than the average size of the particles existing in a quicklime putty hydrated by the method of adding an excess of water to quicklime, the quicklime from which such putty is made being the same as the quicklime from which said dry hydrate is produced.

22. A dry powdered lime hydrate, produced by hydrating at least the calcium oxide content of quicklime with an excess of water in the liquid phase and then substantially instantaneously drying the hydrated quicklime by effecting a finely divided suspension of the particles thereof by dispersing the same in an atmosphere under conditions causing the substantially instantaneous conversion into the vapor phase of excess water in said particles while dispersed, said dry powdered lime hydrate being characterized by its ability to develop a plasticity in excess of 200 and a workable sand carrying capacity in excess of about 3 parts sand to one part lime hydrate by volume substantially immediately upon mixture with water, the average size of the individual particles of said hydrate not being substantially greater than the average size of the particles existing in a quicklime putty hydrated by the method of adding an excess of water to quicklime, the quicklime from which such putty is made being the same as the quicklime from which said dry hydrate is produced.

23. In the hydration of quicklime, the step of substantially instantaneously drying quicklime hydrated with water in excess of that which will combine as water of hydration, which comprises effecting a finely divided suspension of the particles thereof by dispersing the same in an atmosphere under conditions causing the substantially instantaneous conversion into the vapor phase of excess water in said particles while dispersed without deleteriously affecting the physical and chemical properties of said hydrated quicklime.

24. In the hydration of quicklime, the steps which comprise hydrating at least the calcium oxide content of the quicklime with an excess of water in the liquid phase, hydrating under pressure the major portion of the magnesia content of said quicklime with water in excess of that which will combine as water of hydration, and then substantially instantaneously drying the hydrate by effecting a finely divided suspension of the particles thereof by dispersing the same in an atmosphere under conditions causing the substantially instantaneous conversion into the vapor phase of excess water in said particles while dispersed.

25. A dry powdered lime hydrate, produced by hydrating quicklime in a closed chamber under pressure with water in excess of that which will combine as water of hydration, and while the hydrated lime is in a heated condition substantially instantaneously drying the same by suddenly releasing the pressure from said closed chamber into a collecting chamber which is at substantially atmospheric pressure to discharge said hydrated lime from the closed chamber and to effect a finely divided particle dispersion thereof in said collecting chamber, said dry lime hydrate being characterized by its ability to develop a plasticity in excess of 200 and a workable sand carrying capacity in excess of 3 parts sand to one part lime hydrate by volume substantially immediately upon mixture with water.

26. A dry powdered lime hydrate, having the major portion of its magnesia content in the hydroxide form, produced by hydrating, in a closed chamber under pressure with water in excess of that which will combine as water of hydration, lime having at least the magnesia thereof in the oxide form, and while the hydrated lime is in a heated condition substantially instantaneously drying the same by suddenly releasing the pressure from said closed chamber into a collecting chamber which is at substantially atmospheric pressure to discharge said hydrated lime from the closed chamber and to effect a finely divided particle dispersion thereof in said collecting chamber, said dry lime hydrate being characterized by its ability to develop a plasticity in excess of 200 and a workable sand carrying capacity in excess of 3 parts sand to one part lime hydrate by volume substantially immediately upon mixture with water.

27. In the method of making a finely divided hydrated lime having high plasticity, the steps which comprise reacting lime having at least the major portion of its magnesia in the oxide form with an excess of water in the liquid phase in a closed chamber under pressure, and then substantially instantaneously drying the individual particles of the hydrated lime reaction product by releasing said pressure from the closed chamber to discharge said product therefrom into an atmosphere under conditions causing the substantially instantaneous conversion of excess water in said individual particles into the vapor phase which passes off leaving a substantially dry hydrated lime.

28. In the method of making dry hydrated lime, the steps which comprise reacting lime having at least the major portion of its magnesia in the oxide form with water in a closed chamber under pressure generated at least in part by said reaction, said water being in excess of that which will combine as water of hydration, and then spontaneously discharging the hydrated reaction product from said closed chamber into a collecting chamber by suddenly releasing the pressure from the closed chamber so as to produce a substantially dry hydrated lime.

29. A dry powdered lime hydrate produced by hydrating at least the calcium oxide content of the quicklime with an excess of water, hydrating under pressure at least the major portion of the magnesia content of said quicklime with water in excess of that which will combine as water of hydration and then substantially instantaneously vaporizing excess water in the hydrated quicklime by effecting a finely divided suspension of the particles thereof by dispersing the same in an atmosphere under conditions causing the substantially instantaneous conversion into the vapor phase of excess water in said hydrate, said dry powdered lime hydrate being characterized by its ability to develop a plasticity in excess of 200 and a workable sand carrying capacity in excess of about 3 parts sand to one part lime hydrate by volume substantially immediately upon mixture with water, the average size of the individual particles of said hydrate not being substantially greater than the average size of the particles existing in a quicklime putty hydrated by the method of adding an excess of water to quicklime, the quicklime from which such putty is made being the same as the quicklime from which said dry hydrate is produced.

30. In the method of making finely divided dry hydrated lime, the steps which comprise hydrating, with water in a closed chamber under pressure, said water being in excess of that which will combine as water of hydration, lime having at least the magnesia thereof in the oxide form and while the hydrated lime is in a moist heated condition discharging and substantially instantaneously drying the same by releasing the pressure from said closed chamber into a collecting chamber which is at substantially atmospheric pressure, the heated condition of said hydrated lime and the release of said pressure to atmospheric cooperating to effect discharge of the hydrated lime from said closed chamber and to substantially instantaneously convert excess water in the lime into the vapor phase which passes off leaving a substantially dry hydrated lime, and collecting the dry hydrated lime in said collecting chamber.

31. In the method of making dry hydrated lime, the steps which comprise reacting lime having at least the major portion of its magnesia in the oxide form with water in a closed chamber under pressure generated at least in part by said reaction, said water being in excess of that which will combine as water of hydration, and then effecting a finely divided particle dispersion of the hydrated lime by spontaneously discharging the hydrated reaction product from said closed chamber into a collecting chamber by suddenly releasing the pressure from the closed chamber so as to produce a substantially dry hydrated lime.

BOLTON L. CORSON.